United States Patent [19]

Strutman

[11] 4,170,369

[45] Oct. 9, 1979

[54] BICYCLE WHEEL SUSPENSION, DRIVING AND BRAKING ASSEMBLY

[75] Inventor: Warren A. Strutman, St. Louis, Mo.

[73] Assignees: Lauren Strutman; Lisa Strutman; Jerome A. Gross, all of Clayton, Mo.

[21] Appl. No.: 871,752

[22] Filed: Jan. 23, 1978

[51] Int. Cl.² .................... B62M 9/02; B62K 25/02
[52] U.S. Cl. ................................ 280/261; 74/219; 74/243 R; 188/26; 192/45; 280/288; 301/1
[58] Field of Search ............... 280/261, 281, 288; 188/26, 18 A; 301/1, 2, 2.5; 192/45; 74/243 R, 217 B, 219; 180/72

[56] References Cited

U.S. PATENT DOCUMENTS

| | | | |
|---|---|---|---|
| 1,261,035 | 4/1918 | Kenrick | 180/72 |
| 2,497,121 | 2/1950 | Fletcher | 280/261 |
| 2,865,479 | 12/1958 | Hungerford | 192/45 |
| 3,592,487 | 7/1971 | Mansperger | 280/261 |
| 3,675,741 | 7/1972 | Frei | 188/26 |
| 3,933,217 | 1/1976 | Eichinger | 188/18 A |

FOREIGN PATENT DOCUMENTS

| | | | |
|---|---|---|---|
| 493372 | 4/1954 | Italy | 280/281 R |
| 499618 | 11/1954 | Italy | 301/1 |
| 96587 | 10/1922 | Switzerland | 280/281 R |
| 3568 | of 1894 | United Kingdom | 280/281 R |

*Primary Examiner*—John P. Silverstrim
*Attorney, Agent, or Firm*—Jerome A. Gross

[57] ABSTRACT

Bicycle wheels are mounted on single suspension struts, each having an axle secured horizontally. Adjacent to the strut is an independently rotatable assembly. For the rear wheel, the assembly includes an overrunning clutch having its outer driven portion, which bears a brake disc, splined into the inner surface of the wheel hub, and its inner driving ratchet operably coupled to a drive sprocket. For the front wheel, an identical wheel hub is splined into the outer surface of a rotatable assembly which bears a brake disc.

2 Claims, 4 Drawing Figures

BICYCLE WHEEL SUSPENSION, DRIVING AND BRAKING ASSEMBLY

BACKGROUND OF THE INVENTION

The present invention generally relates to bicycles, motorcycles, and other wheeled machines. In particular it relates to means for providing braking and delivering power to wheels which may be easily removed for replacement.

Conventional bicycles employ forked frame struts for mounting of wheels, making wheel replacement difficult. Many vehicles require front and rear wheels with different hubs, to accommodate drive and braking mechanisms.

SUMMARY OF THE INVENTION

An object of the present invention is to provide an easily replaceable bicycle wheel. Another object is to provide a bicycle wheel which is interchangeable for either front or rear use. Still further objects will be apparent from the disclosure which follows.

Briefly summarizing, the present invention comprises front and rear bicycle wheels whose hubs are internally splined, single-sided (rather than forked) suspension struts front and rear, each having a projecting axle, and rotatable assemblies adjacent to the struts for braking.

In the rear, the rotatable assembly also includes a chain drive sprocket adjacent to the strut and an overrunning clutch mounted on the axle within the sprocket, its inner driving ratchet being coupled to the sprocket and its outer driven portion having, adjacent to the wheel, a longitudinally splined outer surface bearing a brake disc, which is thereby positioned between the wheel and the drive sprocket.

For the front wheel, a rotating brake sleeve from which a brake disc extends is mounted by a bearing on the axle adjacent to the strut; this sleeve has a splined outer surface similar to that of the overrunning clutch of the rear wheel.

The front and rear wheels are identical. Each has a hub enlarged adjacent to the rotatable assembly; its inner surface is splined to accept the outer surface of either the rear overrunning clutch or the front brake sleeve, being thereby interchangeable for either front or rear use.

The wheels are mounted on thrust bearings on the axles, each secured in place by a nut on the axle end, and are braked and receive power from the rotatable assemblies with the splined surfaces. The wheels may be removed without removing or changing the position of the chain, sprockets or brakes for replacing a tire, or for storage or transportation.

DESCRIPTION OF THE PREFERRED EMBODIMENT

In the preferred embodiment of the present invention, several of the elements are, in part, conventional, including a portion of the bicycle frame. The conventional elements of the frame, made of steel tubing, include a nearly upright, aft-slanting strut a (hereafter called the upright strut) and a top horizontal strut b, welded together at the rear of the top horizontal strut b. The front of the top horizontal strut b is connected to the lower end of the upright strut a by a front diagonal strut c. Mounted on a post which extends upward from within the upright strut a is a conventional bicycle seat d. At the intersection of the top horizontal strut b and front diagonal strut c is a steering journal e. Conventional bicycle handlebars f are mounted thereat to a front steering strut, to be described below. At the intersection of the upright strut a and the diagonal strut c is a conventional crank and sprocket assembly, generally designated g, including a left pedal and crank h and a right pedal and crank j supported by a bearing in a heavy steel crank hub k. The crank and sprocket assembly also includes a crank sprocket m on the right side of the crank bearing k and a drive chain n to the drive sprocket, hereafter described.

Figure 1:
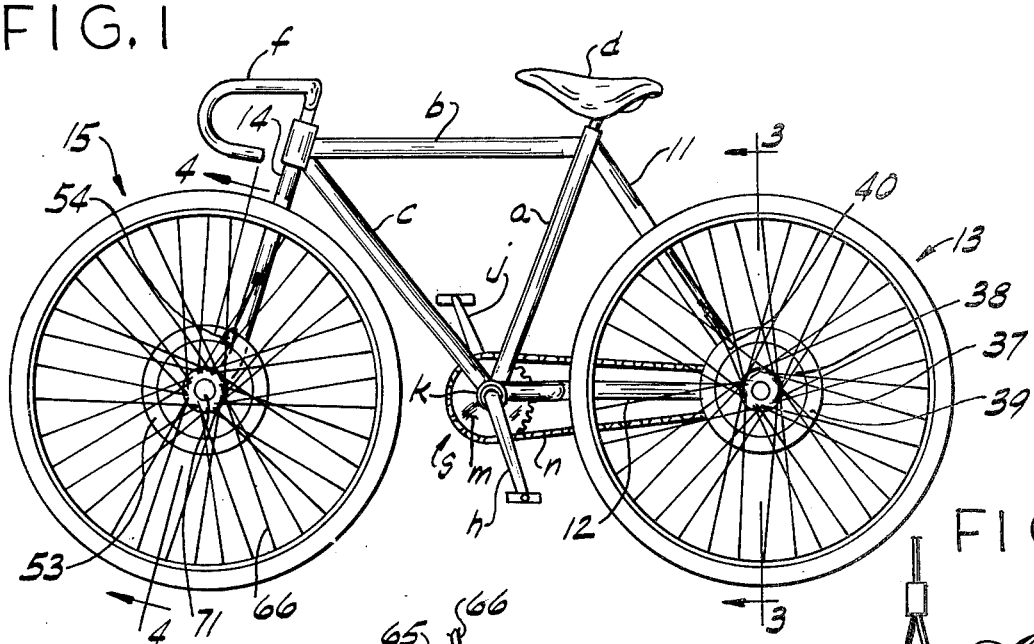
FIG. 1 is a left elevation view of a bicycle embodying the present invention.
Figure 2:
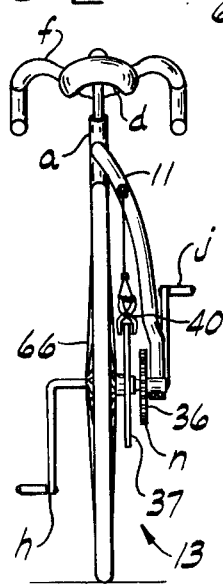
FIG. 2 is a rear elevation view of the bicycle of FIG. 1

In the present invention an asymmetric rear diagonal strut 11 is welded from the intersection of the top horizontal strut b and upright strut a downward and rearward. An asymmetric rear horizontal strut 12 is connected from the crank hub k to the lower end of the rear diagonal strut 11. The rear diagonal strut 11 curves outward from the central plane as shown in FIG. 2, to accommodate a rear or driving wheel assembly, generally designated 13, directly behind the upright, or seat-mounting strut a; the rear horizontal strut 12 has a similar outward curvature from its bent-forward end 16, which is welded to the rear side of the crank hub k.

A front steering strut 14 is fitted rotatably into the steering journal e, its upper portion extending upward therethrough and being connected to the bicycle handlebars f. Below the steering journal e, the front steering strut 14 is curved outward, similarly to the rear struts 11, 12, to accommodate a front or nondriven braked wheel assembly, generally designated 15, along its inner side.

Figure 3:
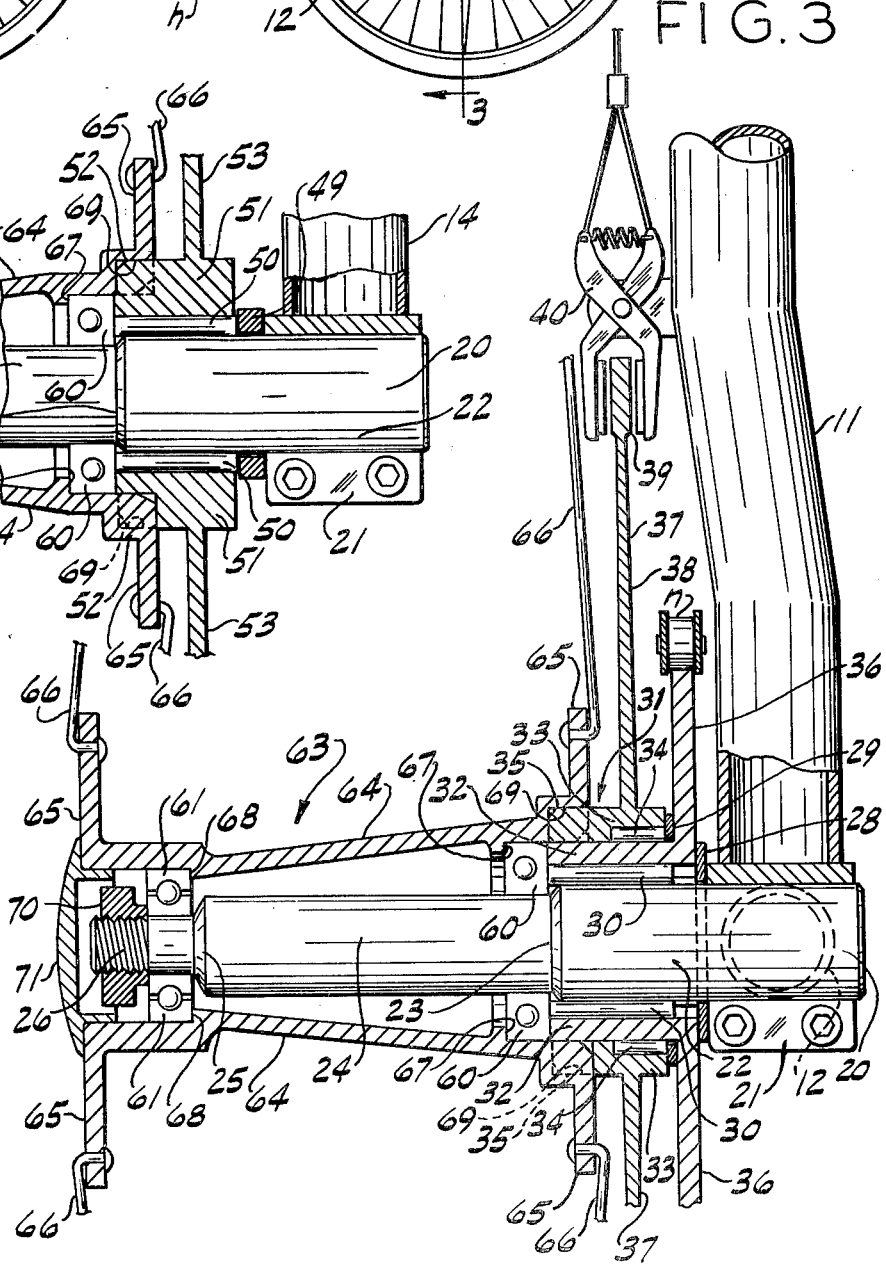
FIG. 3 is an enlarged fragmentary cut-away view of the rear wheel assembly taken along line 3—3 of FIG. 1.

At the lower end of the front steering strut 14, and at the intersection of the rear horizontal strut 12 and the rear digonal strut 11, are horizontally mounted leftward-extending rigid axles 20, fastened in transverse clamp fittings 21. Each axle 20, as shown in FIG. 3 and in part in FIG. 4, has a full diameter thickened portion 22 extending outward to a first reducing shoulder 23. Outward from the first reducing shoulder 23 is an intermediate axle portion 24 extending to a second reducing shoulder 25. Outward of the second reducing shoulder 25 is an outward portion having a threaded end 26.

In the present invention, the front and rear wheels are themselves identical, but the rear wheel assembly 13 and front wheel assembly 15 differ in part, as hereinafter described.

For the rear wheel assembly 13, as shown in FIG. 3, a rotatable driving and braking assembly has a needle bearing 30 fitted about the full diameter portion 22 of the rigid axle 20. About the needle bearings 30 is a conventional overrunning clutch, generally designated 31, which has an inner driving ratchet 32, an outer driven or overrunning portion 33, and conventional drive rollers 34 mounted therebetween to engage and drive the overrunning portion 33, although permitting it to overrun. The outer driven portion 33 of the overrunning clutch 31 has a splined exterior surface 35. Extending outward radially from that side of the inner driving ratchet 32 adjacent to the rear struts 11, 12, is a drive sprocket 36 separated from the overrunning portion 33 by a washer 28 and from the clamp fitting 21 by a washer 29. Extending radially outward from the outer driven portion 33 of the overrunning clutch 31 is a brake disc 37, having a thin radially inner portion 38 and a thickened outer portion 39. The clutch 31 serves to mount the brake disc 37 to the drive sprocket 36. The drive chain n connects the drive sprocket 36 to the crank sprocket m. A brake caliper assembly 40, as shown schematically in FIG. 3, is borne by the rear diagonal strut 11 adjacent the thickened outer portion 39 of the brake disc 37 and engages about the grasps and releases the thickened outer portion 39 in a conventional manner.

Figure 4:
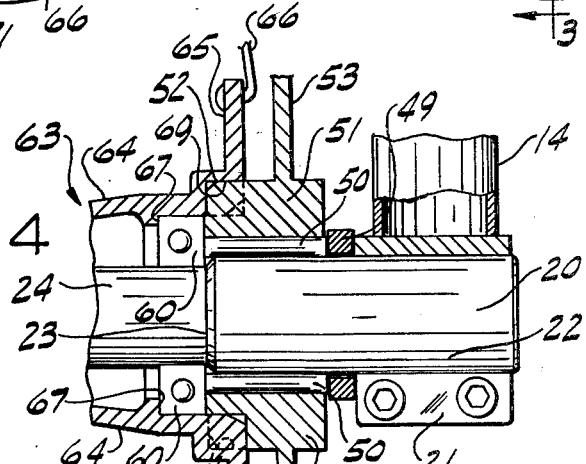
FIG. 4 is a fragmentary cut-away view of the front wheel assembly taken along line 4—4 of FIG. 1. This wheel, in its portions not shown, is identical to the wheel of FIG. 3.

For the front wheel assembly 15, as shown in FIG. 4, a rotatable braking assembly has a needle bearing 50, adjacent to which is a tubular spacer 49 of larger diameter, both supported on the full diameter portion 22 of the rigid axle 20. Supported on the needle bearing 50 is a brake hub 51, which has a splined exterior surface 52 on the side opposite the front steering strut 14 identical to the splined exterior surface 35 of the overrunning clutch 31. Extending radially outward from the brake hub 51 is a brake disc 53, in all aspects identical to the brake disc 37 of the rear wheel. The front wheel assembly 15, shown in the detail view FIG. 4, also has a brake caliper 54 similar to the brake caliper 40 of the rear wheel assembly 13, mounted onto the front steering strut 14 adjacent to the brake disc 53.

The identical parts of the front and rear wheel assemblies 13, 15 remain to be described. A first wheel bearing 60, preferably of the thrust-reacting ball bearing type, is mounted on the intermediate portion 24 of the axle 20 immediately outward of and adjacent to the first reducing shoulder 23, while a second wheel bearing 61 of the same type is mounted adjacent to the threaded end portion 26 of the axle 20 immediately outward of and adjacent to the second reducing shoulder 25. The wheel, generally designated 63, has a hollow wheel hub 64 with radially outward extending flanges 65 to which are attached conventional bicycle spokes 66. The wheel hub 64 is mounted on the axle 20, its inner surfaces tapering decreasingly from its side adjacent the strut and being supported by the first and second wheel bearings 60, 61. The wheel hub 64 has a thrust-applying shoulder 67 adjacent the outer side of the first wheel bearing 60 and a second thrust-receiving shoulder 68 adjacent the inner side of the second wheel bearing 61. The wheel hub 64 has a splined interior surface 69 on its side adjacent the wheel strut, axially inward of the first wheel bearing 60. On axial sliding toward the strut 11, 14, the splined interior surface 69 of one hub 64 will engage axially either the splined exterior surface 35 of the rear overrunning clutch 31 in a driving relationship or the splined exterior surface 52 of the front brake hub 51 in braking operation.

The wheel 63 is retained on the axle 20 by a nut fastener 70 on the threaded end portion 26 of the axle 20. The nut fastener 70 presses toward the strut against the outer edge of the second wheel bearing 61, which presses against the thrust-receiving shoulder 68, as the hub shoulder 67 nearer the strut presses against its adjacent wheel bearing 60, to retain the wheel hub 64 in place. A dust cap 71 is snap fitted to the end of the wheel hub 64.

The present invention provides a unique way of delivering torque and braking action to the wheel 63, that is, through the splined connections (or like means) which allow the wheel to be removed axially from the asymmetric strut.

Positive braking action is provided when the brake caliper 40 is squeezed to grasp or releasably engage the thickened outer portion 39 of the brake disc 37, since the brake disc 37 is directly coupled to the wheel hub 64 via the splined surfaces. For the front wheel assembly 15, similar braking action is provided by the brake caliper 54 grasping the brake disc 53, which is likewise coupled to the brake hub 64 via the splined surfaces. When released, the brake calipers 40, 54 are clear of the brake discs 37, 53.

To remove a wheel 63, the dust cap 71 is snapped off and the nut fastener 70 is removed, permitting the wheel 63 to be pulled from the axle 20. The second wheel bearing 61 is removed with the wheel 63, while the first wheel bearing 60 may remain in place on the axle 20. The wheel hub 64 thus becomes disengaged from the splined exterior surfaces of either the overrunning clutch 31 or the brake hub 51, as the case may be. This does not require removal of either the drive sprocket 36 or brake disc 37, 52; they remain in their identical positions on the axle 20. This is in contrast to present conventional procedures, according to which the wheels may be removed without disassembly from axles only radially and by special provisions such as slots in the fork ends.

To put a wheel 63 onto the bicycle, the reverse procedure is followed. The hub 64 of a wheel 63 is pushed onto the axle 20 and rotated as necessary until the splined interior surfaces 69 of the wheel hub 64 engage the splined exterior surfaces of the overrunning clutch 31 or brake hub 51, as the case may be. The outer wheel bearing 61 is adjusted in position on the outer end of the axle 20 and the nut fastener 70 is screwed into place. Considerable time saving is thus obtained, since the alignment procedures required for conventional bicycles are not required and the brakes and the chain and sprocket are not interfered with. The ease of removal of the wheels facilitates storage in cramped spaces and transportation in an automobile.

It is quite significant that the rear wheel assembly 13 and front wheel assembly 15 both utilize identical wheels 63, since this permits interchangeability. The manufacturer need only make one wheel type for both front and rear use, and bicycle owners and tire repairers may keep a single wheel on hand as a spare or exchange wheel.

The defined inter-engagment between the splined inner surfaces 69 of the rear and front wheel hubs 64 and the complementarily splined outer surfaces 35, 52 of the overrunning clutch 31 and front brake sleeve 51 serve as axially releasable means to engage the wheel hubs 64 at their sides adjacent to the braking and driving assemblies, when these wheels are merely pressed toward the struts 11, 12 and 14. It will be recognized that for the splined means described, other releasable means may be substituted within this disclosure, which when engaged will transmit driving torque and yet permit axial removal on disengagement.

Other modifications of the above-described embodiment will be apparent to persons skilled in the art. For example, if freewheeling is not desired for the rear wheel, the drive sprocket and brake disc may be integrally formed or secured without need for an overrunning clutch. Likewise, if it is desired to affix the brake disc permanently to the wheel, to be removable and replaceable therewith on displacement of the brake caliper, this would still permit axial removal and replacement of the wheel without disassembly of the axle, which is a substantial advantage of the present invention.

I claim:

1. For bicycles and the like, a driving wheel assembly comprising
   an asymmetric suspension strut,
   a rigid axle mounted horizontally on the lower end of said strut and having thereon
   a. a rotatable driving and braking assembly mounted adjacent to said strut and including bearing means,
   an overrunning clutch having
   an inner driving ratchet mounted on said bearing means and having a drive sprocket extending radially from that end of the inner driving ratchet adjacent to such strut, said overrunning clutch further having
   an outer driven portion mounted on said driving ratchet adjacent to said sprocket at its side opposite to said strut, and having a brake disc extending radially outward therefrom, said axle further having thereon
   b. wheel bearing means outward of said driving and braking assembly,
   c. a wheel having a hollow hub mounted on said wheel bearing means, and
   d. fastener means removably mounted at the outward end of the wheel to secure the wheel hub pressed toward said rotatable assembly and said strut,
   e. the said outer driven portion of said overrunning clutch and the wheel hub portion adjacent thereto together having axially releasable means for interengagement thereof when the wheel is so pressed toward the strut, in combination with
   f. caliper means positioned on said strut to engage opposite sides of said brake disc,
   whereby when the wheel is so pressed it is subject to braking, and when said fastener means is removed the wheel may be removed and replaced axially without interference with the caliper means or said rotatable driving and braking assembly.

2. A bicycle having interchanbeable front and rear wheels which are easily removed and replaced axially, comprising
   front and rear asymetric suspension struts,
   front and rear rigid axles mounted on the lower ends of said struts,
   said rear axle having a rotatable driving and braking assembly mounted thereon in a position located axially between said wheel hub and said strut, including
   bearing means,
   an overrunning clutch having an inner driving ratchet mounted on said bearing means and having an outer driven portion mounted on said inner driving ratchet, said rotatable driving and braking assembly further including
   a drive sprocket mounted on said inner driving ratchet and positioned adjacent to said strut, and
   a brake disc mounted on said outer driven portion at that side of the drive sprocket outward from said strut,
   said front axle having a rotatable braking assembly mounted thereon in a position located axially between said wheel hub and said strut, including
   bearing means and
   a brake hub mounted rotatably on said bearing means and having a brake disc,
   each said strut having caliper means borne thereby to grasp and release said brake disc mounted outward from said strut, such bicycle further having
   substantially identical wheels mounted on said rear and front axles, each having a hollow hub mounted rotatably on wheel bearing means on said axles, there being
   fastener means removably mounted at the outward end of the wheel to press the hub of the wheel thereon toward said strut,
   said front brake hub and said outer driven portion of said overrunning clutch each having, together with said wheel hubs, torque transmitting means to engage the wheel hub when the wheel is so pressed toward the strut and to disengage when said fastener means is removed,
   whereby like wheels may be interchangeably used on said front and rear axles and changed without interference with the caliper means.

* * * * *

UNITED STATES PATENT AND TRADEMARK OFFICE
CERTIFICATE OF CORRECTION

PATENT NO. : 4,170,369

DATED : October 9, 1979

INVENTOR(S) : Warren A. Strutman

It is certified that error appears in the above-identified patent and that said Letters Patent are hereby corrected as shown below:

In column 2, line 49, delete "digonal" and insert ---diagonal---.

In column 3, line 18, delete "the" second occurrence and insert -- and --.

In column 5, line 4, delete "cluth" and insert ---clutch---.

In column 6, line 3, delete "interchanbeable" and insert ---interchangeable---.

Signed and Sealed this

First Day of January 1980

[SEAL]

Attest:

SIDNEY A. DIAMOND

Attesting Officer

Commissioner of Patents and Trademarks